(12) United States Patent
Rosignoli et al.

(10) Patent No.: US 12,358,736 B2
(45) Date of Patent: Jul. 15, 2025

(54) APPARATUS AND METHOD FOR CONVEYING ARTICLES AND PLANT AND METHOD FOR PACKAGING SAID ARTICLES

(71) Applicant: CT PACK S.R.L., Valsamoggia (IT)

(72) Inventors: David Rosignoli, Pontegradella (IT); Fabrizio Pavanelli, Ferrara (IT)

(73) Assignee: CT PACK S.R.L., Valsamoggia (IT)

( * ) Notice: Subject to any disclaimer, the term of this patent is extended or adjusted under 35 U.S.C. 154(b) by 193 days.

(21) Appl. No.: 18/126,598

(22) Filed: Mar. 27, 2023

(65) Prior Publication Data

US 2023/0312270 A1 Oct. 5, 2023

(51) Int. Cl.
*B65G 54/02* (2006.01)
*B65B 23/12* (2006.01)
(Continued)

(52) U.S. Cl.
CPC .............. *B65G 54/02* (2013.01); *B65B 23/12* (2013.01); *B65B 57/14* (2013.01); *B65G 35/08* (2013.01);
(Continued)

(58) Field of Classification Search
CPC ........ B65G 54/02; B65G 35/08; B65G 43/00; B65G 2201/0202; B65G 2203/0283;
(Continued)

(56) References Cited

U.S. PATENT DOCUMENTS

| 7,458,454 B2 * | 12/2008 | Mendenhall ........... B65G 35/06 198/463.3 |
| 9,202,719 B2 * | 12/2015 | Lu ........................ H02K 1/2795 |

(Continued)

FOREIGN PATENT DOCUMENTS

| DE | 102012210329 A1 | 12/2013 |
| DE | 102014119351 A1 | 6/2016 |

(Continued)

OTHER PUBLICATIONS

European Search Report dated Nov. 17, 2023 from European App No. 23165381.

(Continued)

*Primary Examiner* — Mark A Deuble
(74) *Attorney, Agent, or Firm* — SHUTTLEWORTH & INGERSOLL, PLC; Timothy J. Klima

(57) ABSTRACT

An apparatus for conveying articles comprising:
  a conveying surface comprising a plurality of electrically magnetizable elements;
  a plurality of units for conveying articles, movable on said conveying surface, each conveying unit being defined by a first transport element and a second transport element configured to be coupled with each other and to define together a seat for housing articles, the first and the second transport element comprising each at least one magnetic element;
  a control unit, connected to said electrically magnetizable elements of the conveying surface to activate and deactivate them, so as to generate a variable predetermined magnetic field on said conveying surface and to allow consequently the movement of said first transport element and second transport element above said conveying surface.

17 Claims, 7 Drawing Sheets

Figure 1:
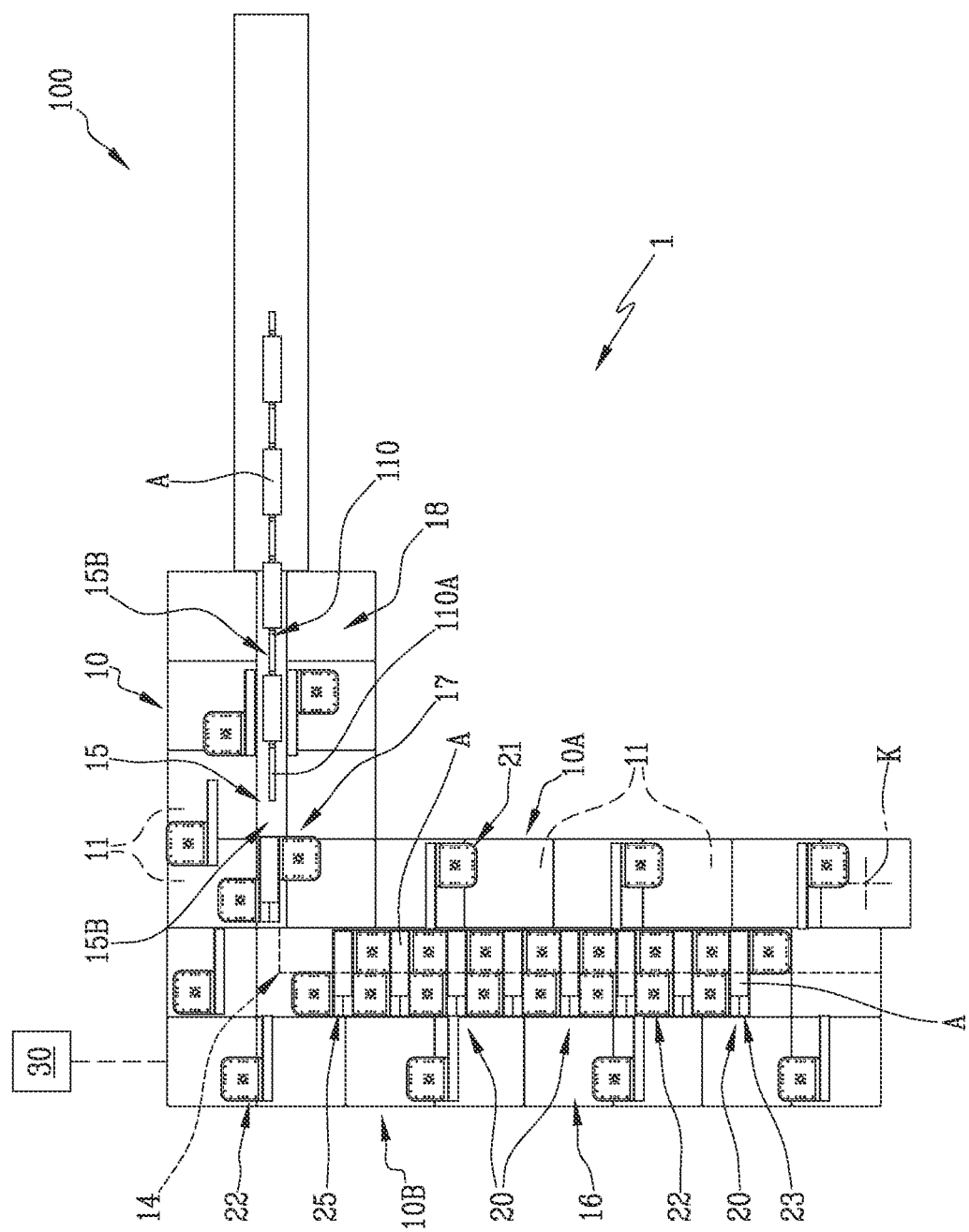

(51) Int. Cl.
 *B65B 57/14* (2006.01)
 *B65G 35/08* (2006.01)
 *B65G 43/00* (2006.01)

(52) U.S. Cl.
 CPC ...... *B65G 43/00* (2013.01); *B65G 2201/0202* (2013.01); *B65G 2203/0283* (2013.01)

(58) Field of Classification Search
 CPC ....... B65G 47/256; B65B 23/12; B65B 35/30; B65B 57/14; B07C 5/16; B07C 5/3422; B07C 2501/0081
 See application file for complete search history.

(56) References Cited

U.S. PATENT DOCUMENTS

| | | | | |
|---|---|---|---|---|
| 9,260,210 | B2* | 2/2016 | Jacobs | B65G 57/03 |
| 9,701,488 | B2* | 7/2017 | Paweletz | H02K 41/031 |
| 10,618,749 | B2* | 4/2020 | Clössner | B65G 37/02 |
| 11,745,955 | B2* | 9/2023 | Ford | B65G 54/02 198/619 |
| 12,024,372 | B2* | 7/2024 | Grinnell | G01M 3/3281 |
| 2016/0176659 | A1* | 6/2016 | Aumann | B65G 54/02 198/619 |
| 2017/0320682 | A1 | 11/2017 | Paweletz | |
| 2018/0246042 | A1* | 8/2018 | Piana | B65G 47/2445 |
| 2019/0233220 | A1 | 8/2019 | Ragan | |
| 2021/0371204 | A1* | 12/2021 | Mutarelli | B60L 13/04 |

FOREIGN PATENT DOCUMENTS

| | | |
|---|---|---|
| DE | 102014226965 A1 | 6/2016 |
| DE | 102018102612 A1 | 8/2019 |
| EP | 3109189 B1 | 10/2018 |
| EP | 3656707 A1 | 5/2020 |
| KR | 20170033652 A | 3/2017 |
| WO | 2021001863 A1 | 1/2021 |

OTHER PUBLICATIONS

Italian Search Report dated Nov. 3, 2022 from counterpart Italian Patent Application No. 102022000006365.

* cited by examiner

APPARATUS AND METHOD FOR CONVEYING ARTICLES AND PLANT AND METHOD FOR PACKAGING SAID ARTICLES

This application claims priority to Italian Patent Application 102022000006365 filed Mar. 31, 2022, the entirety of which is incorporated by reference herein.

The present invention relates to an apparatus and a method for conveying articles, in particular foodstuffs (for example biscuits, crisps, etc.) as well as a plant and a method for packaging said articles.

In the food industry, various systems are known for transferring and conveying articles for packaging purposes; such systems are provided with packaging lines, for example of flow-wrapper type.

Disadvantageously, in the known systems the articles conveyed and positioned on the packaging lines can slip and/or roll.

Rubbing and friction caused by slipping and rolling can damage articles and compromise their quality, thus posing the risk of jamming or wear as well of movable elements of the machine due to possible fragments of the articles themselves.

Consequently, the production waste due to defective or ruined articles not satisfying the desired features and that cannot go on towards packaging increases.

Therefore, there exists the need to overcome the above-mentioned drawbacks of the prior art.

Aim of the present invention is to satisfy the above cited need by providing an apparatus and a method for conveying articles that maintain quality and integrity of articles, reducing production waste.

Figure 2:
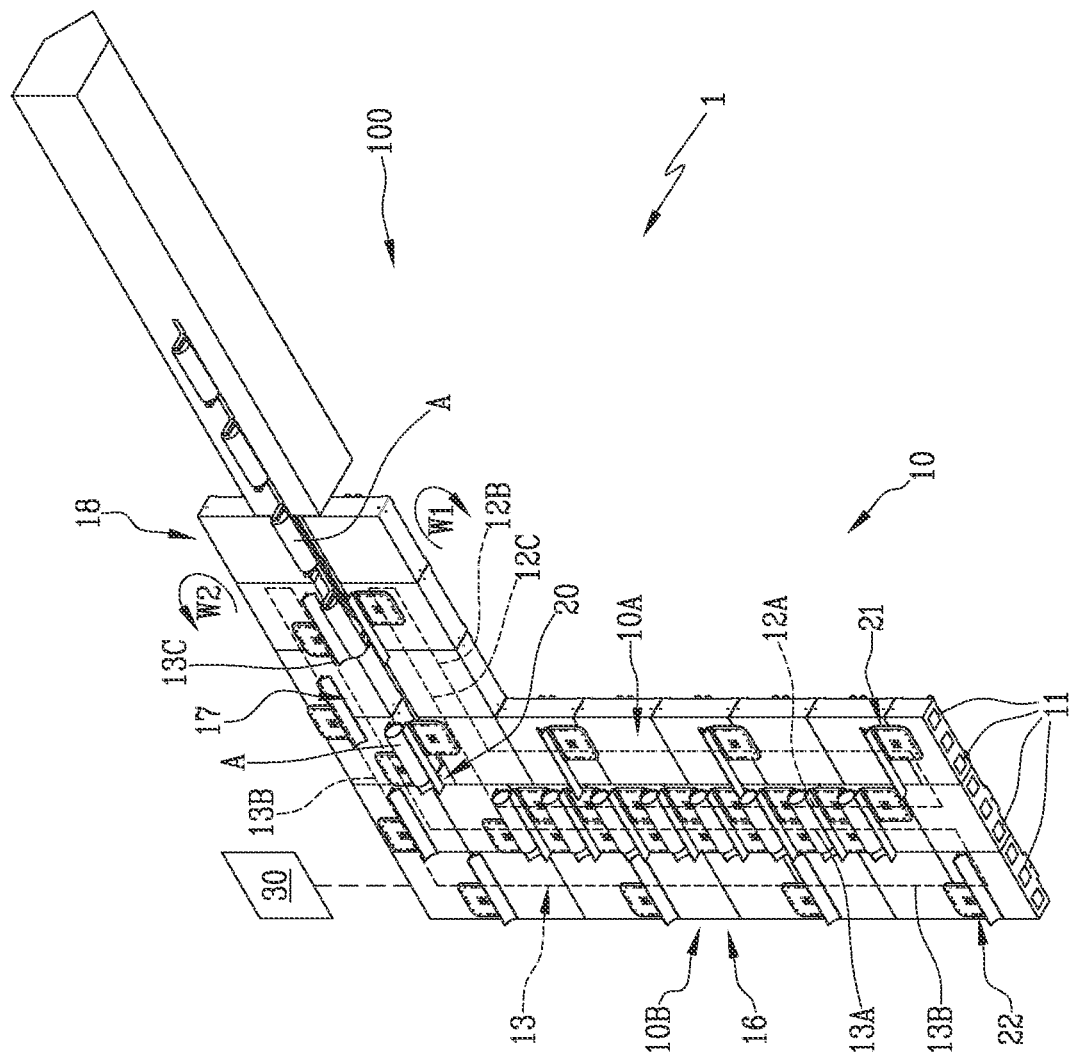
Figure 3:
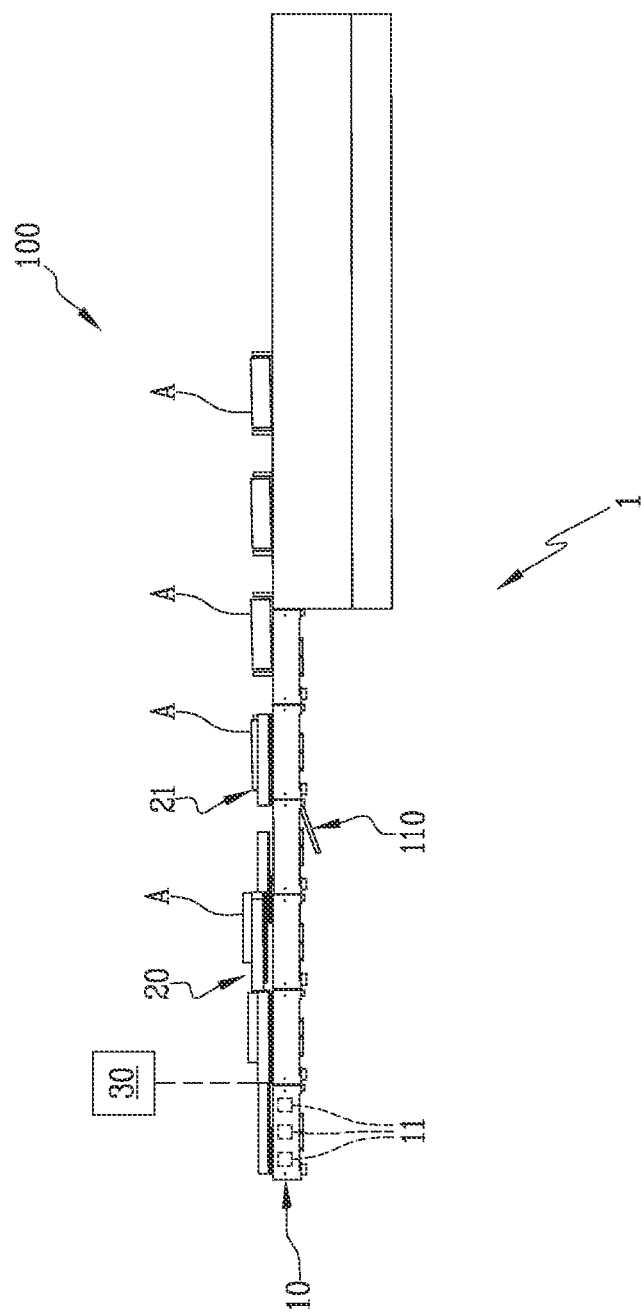
Figure 4:
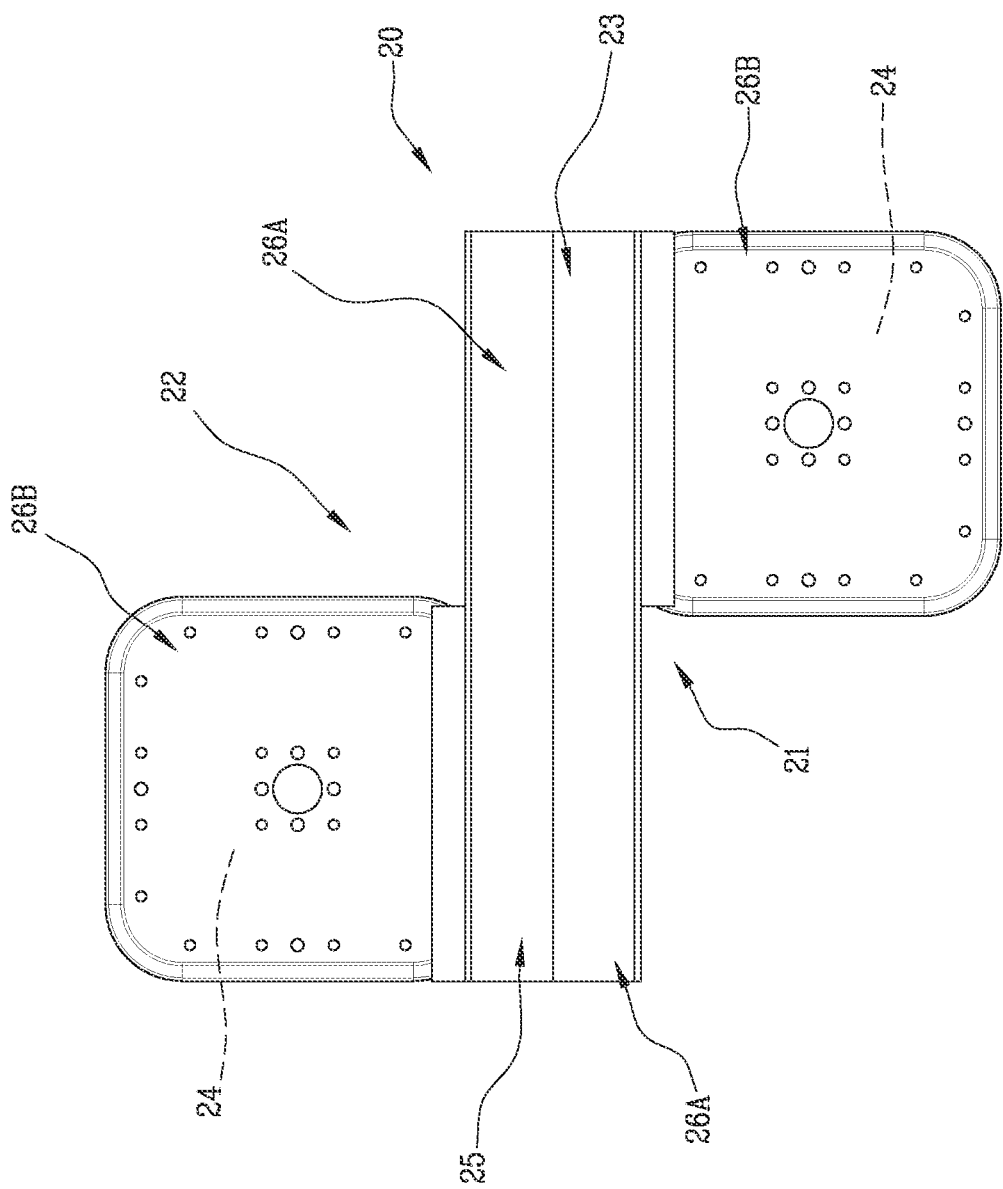
Figure 5:
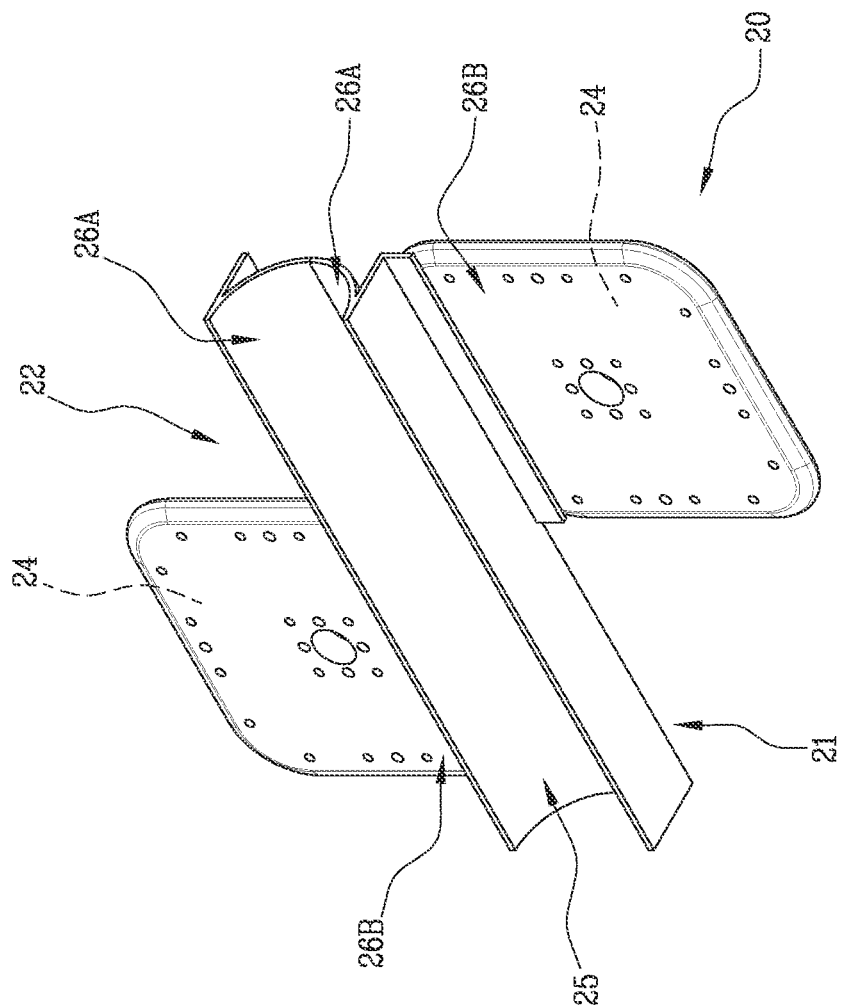
Figure 6:
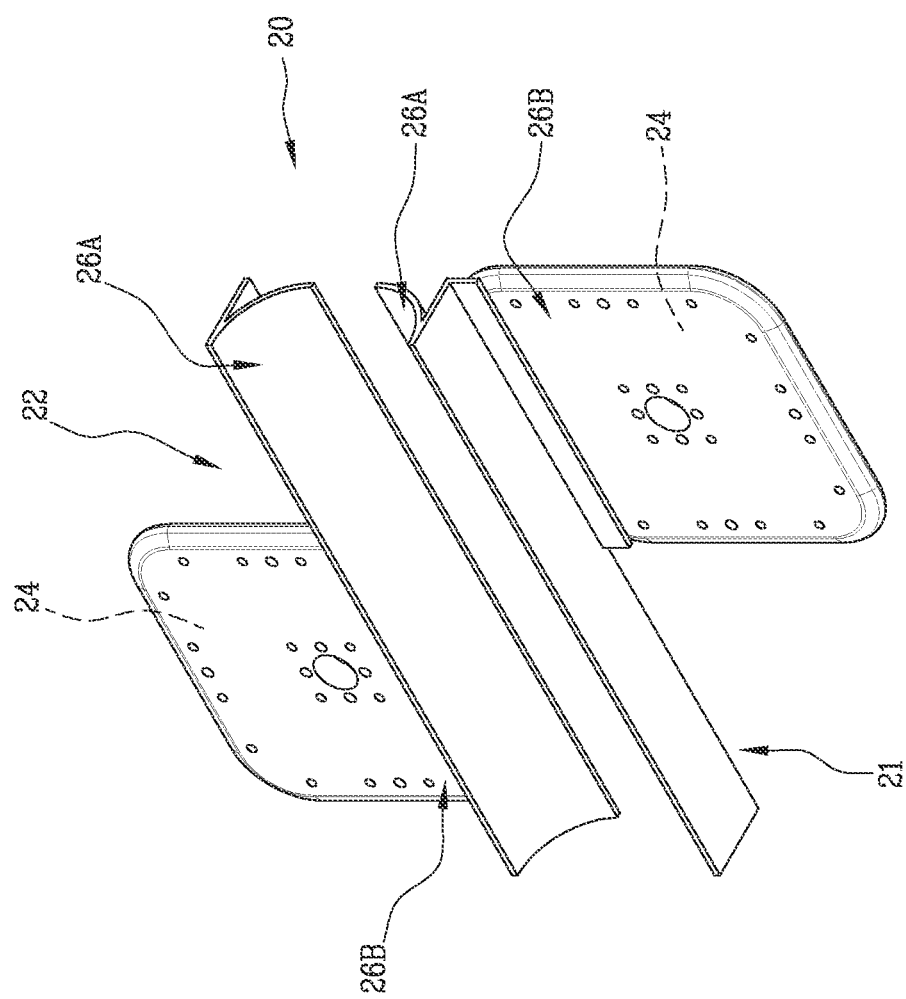
Figure 7:
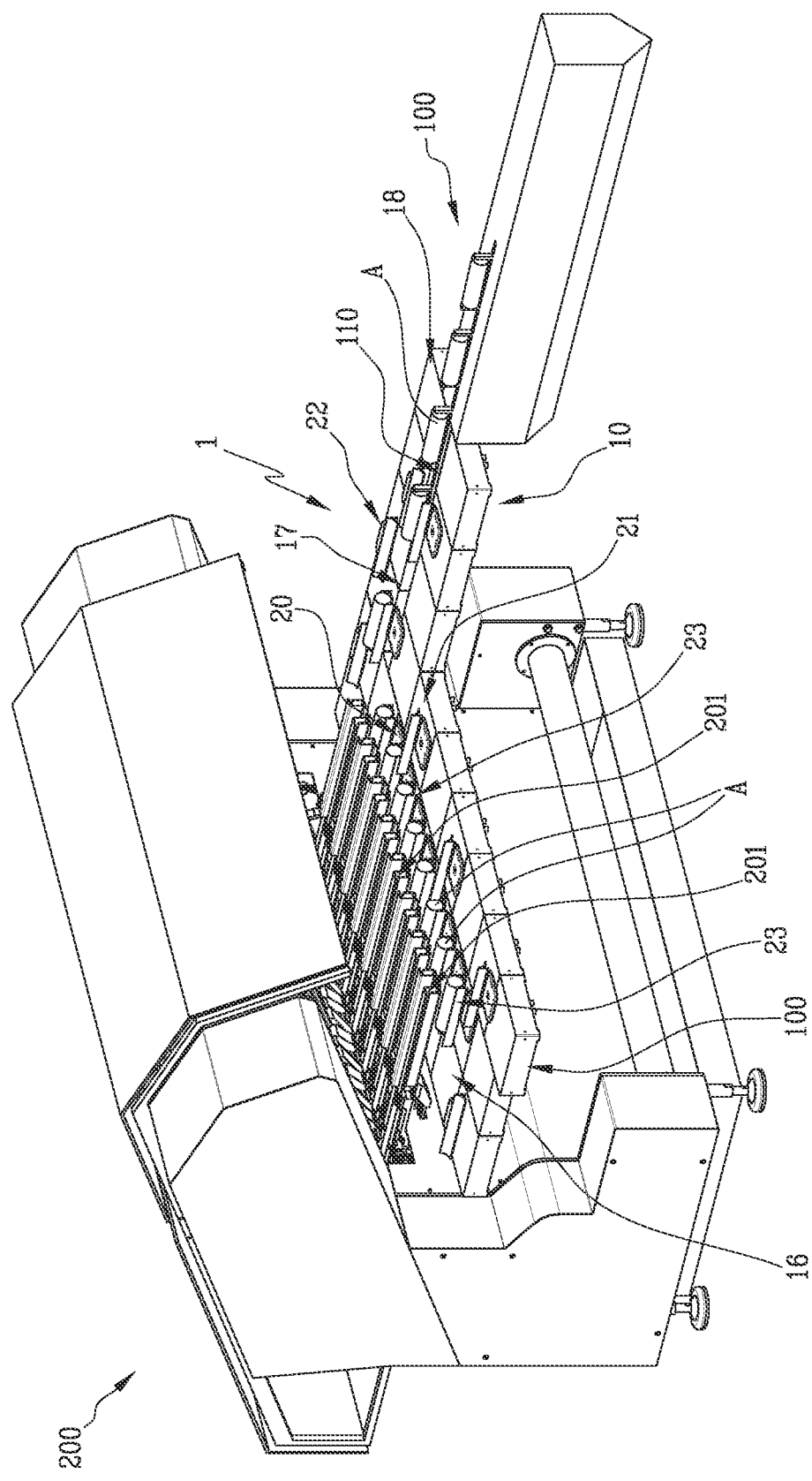

The advantages and features of the apparatus and method for gathering articles together according to the present invention will be clearer from the following description of an exemplary and not limiting embodiment, with reference to the appended drawings, in which:

FIG. 1 shows a top view of a packaging plant comprising an apparatus for conveying articles, according to the present description, FIG. 2 shows a perspective view of the packaging plant of FIG. 1, wherein the apparatus 1 is shown with some removed portions, FIG. 3 shows a side view of the packaging plant of FIG. 1, FIG. 4 shows a front view of a conveying unit of the packaging plant of FIG. 1, according to the present description, FIG. 5 shows a perspective view of the conveying unit of FIG. 4, FIG. 6 shows a perspective exploded view of the conveying unit of FIG. 4, FIG. 7 shows a perspective view of an articles receiving and positioning station and of the packaging plant of FIG. 1.

According to an aspect of the description, the description relates to an apparatus 1 for conveying articles A.

The articles A are foodstuffs, as for example biscuits, crisps etc.

Preferably, but not limitingly, the cited articles A are packageable articles, for example in packaging tubes.

The apparatus 1 comprises a conveying surface 10 comprising a plurality of electrically magnetizable elements 11, as it is shown in FIG. 2.

In a preferred embodiment, the electrically magnetizable elements 11 are defined by electrical coils (i.e. electrical cables wound according to a predetermined geometry), possibly connected to a ferromagnetic material.

The apparatus 1 comprises a plurality of units 20 for conveying articles A.

The units 20 are movable on the conveying surface 10.

Each conveying unit 20 is defined by a first transport element 21 and a second transport element 22 configured to be coupled with each other.

The first and second transport element 21, 22 define together a seat 23 for housing articles A.

Preferably, the seat 23 defined by the first and second transport element 21, 22 is provided with an upper opening 25, to allow the articles A to be introduced inside the seat 23 itself from above.

Each first and second transport element 21, 22 comprises at least a magnetic element 24.

Each first and second transport element 21, 22 comprises respectively a first portion 26A for housing articles A defining a portion of the seat 23 and a second portion 26B in which the magnetic element 24 is housed.

In an embodiment shown in FIGS. 4-6, the portion 26A is substantially a hollow semi-cylinder intended to house articles A and the portion 26B defines a wing of the unit 20 and is preferably, but not limitingly, provided with a square section with beveled angles.

So, it is to be observed that the seat 23 is preferably shaped as a hollow semi-cylinder.

In a preferred embodiment, the first and second transport element 21, 22 have same shape.

The apparatus 1 comprises a control unit 30.

The control unit 30 can comprise hardware and/or software electronic modules, arranged in the same control device or of distributed type.

The control unit 30 is connected to the electrically magnetizable elements 22 of the conveying surface 11 to activate and deactivate them, so as to generate a predetermined variable magnetic field on the conveying surface 10.

By deactivating and activating the magnetizable elements 11 the control unit 30 allows each first and second transport element 21, 22 to be moved on the conveying surface 10.

It is also to be observed that the control unit 30 is configured to activate the magnetizable elements 11 by adjusting the intensity of the magnetic field on the conveying surface 10 generated by such activated magnetizable elements 11.

In particular, the magnetic field on the conveying surface 10 interacts with the magnetic elements 24 of each first and second element 21, 22, thus allowing their movement on the surface 10 itself.

Advantageously, the articles A contained in the seats 23 are transported along the surface 10 thanks to the movement of the units 20 along the surface 10 itself.

By means of the movement of the conveying units 20 the articles A are transported avoiding slipping or rolling, maintaining the integrity of the articles A themselves.

It is to be observed that, preferably, the conveying units 20 are moved on the conveying surface 10 without slipping, i.e. they are kept lifted as a result of the magnetic field generated by the magnetizable elements 11.

In an embodiment, the electrically magnetizable elements 11 are configured to allow to generate a variable magnetic field to move the first and second transport elements 21, 22 of the conveying units 20 in at least a first direction x and/or in a second direction y, orthogonal to the first direction x, on the conveying surface 10.

Such directions x and y lie on the conveying surface 10.

In particular, the control unit 30 is configured to control the electrically magnetizable elements 11 so as to move the transport elements 21, 22 along directions x, y of the conveying surface 10.

Advantageously, by moving the transport elements 21, 22 along the directions x and y, it is possible to individuate paths for the elements 21, 22 themselves.

In a not shown embodiment, the electrically magnetizable elements 11 are configured to allow to move the first and second transport elements 21, 22 of the conveying units 20 also along a third direction z, orthogonal to the directions x and y.

In a not shown embodiment, the electrically magnetizable elements 11 are configured to allow to generate a variable magnetic field to rotate the first and second transport elements 21, 22 of the conveying units 20 about an axis of rotation K on the conveying surface 10.

Preferably, the axis K is orthogonal to the conveying surface 10.

The control unit 30 is configured to control the electrically magnetizable elements 11 so as to rotate the elements 21, 22 about the axis of rotation K.

According to an aspect, the conveying surface 10 comprises a first portion 10A and a second portion 10B.

The first portion 10A of the conveying surface 10 does not coincide with the second portion 10B of the conveying surface 10.

It is to be observed that the first portion 10A of the conveying surface 10 and the second portion 10B of the conveying surface 10 share a common boundary 14.

The control unit 30 is configured to control the electrically magnetizable elements 11 of the conveying surface 10 so as to move the first transport elements 21 in the first portion 10A along a first closed path 12 and the second transport elements 22 in the second portion 10B along a second closed path 13.

The first closed path 12 is not overlapped to the second closed path 13.

In an example, the first transport elements 21 move along the first closed path 12 in a clockwise direction w1 and the second transport elements 22 move along the second closed path 13 in a counterclockwise direction w2.

The first closed path 12 comprises a first portion 12A and a second portion 12B.

The second closed path 13 comprises a first portion 13A and a second portion 13B.

Along the portions 12A and 13A of the first and second closed path 12 and 13, the transport elements 21, 22 are coupled defining the seat 23 of the unit 20.

Along the portions 12B and 13B of the first and second closed path 12 and 13, the transport elements 21, 22 are not coupled and do not transport any article A.

Furthermore, the first closed path 12 comprises a third portion 12C and the second closed path 13 comprises a third portion 13C. As it will be explained better in the following, along the portions 12C and 13C of the first and second closed path 12 and 13, the transport elements 21, 22 can be uncoupled to allow possible defective articles A to be discarded or can remain coupled until a release of the articles A to be conveyed.

Inside the conveying surface 10, along each closed path 12, 13 it is possible to individuate an area 16 for receiving articles A, an area 17 for discharging defective articles A and an area 18 for releasing the conveyed articles A.

The area 16 for receiving articles A comprises the portions 12A and 13A of the first and second closed path 12 and 13.

In fact, in the receiving area 16 the transport elements 21, 22 are coupled, defining the seat 23 of the unit 20.

The articles discharging area 17 and the articles releasing area 18 comprise the portions 12C and 13C of the first and second closed path 12 and 13.

Along the portions 12C and 13C, the transport elements 21, 22 can be uncoupled in the articles discharging area 17 to allow possible defective articles A to be discarded or can remain coupled up to the articles releasing area 18 in order to be then uncoupled and to allow the release of the articles A to be conveyed.

The transport elements 21, 22, coupled so to constitute the conveying unit 20, receive in the receiving area 16 articles A that are then arranged in the seat 23 of the conveying unit 20.

In particular, the control unit 30 is configured to control the electrically magnetizable elements 11 in the area 16 for receiving articles A of the conveying surface 10, so that the first and the second transport element 21, 22 are coupled (so as to define the seat 23) and can receive articles (in the seat 23).

The articles A can be introduced in the seats 23 of the units 20 for example by means of articles receiving and positioning stations 200 of the type shown in FIG. 7, in which the articles A are positioned in the respective seats 23 by means of rotating platform scales 201.

The coupled transport elements 21, 22 move along the portion 12A and 13A of the first and second closed paths 12 and 13 until they reach the area 17 for discharging defective articles A and in the following the area 18 for releasing conveyed articles A.

By means for example of a system of cameras (not shown), it is possible to evaluate the integrity of the transported articles.

In an embodiment, the conveying surface 10 is provided with an opening 15.

The opening 15 allows to move the conveyed articles A away from the conveying surface 10.

The portions 12C and 13C of the first and second closed path 12 and 13 are developed on opposite portions of the opening 15.

The opening 15 is preferably provided with a discharge portion 15A and a transport portion 15B.

The transport portion 15B is arranged downstream of the discharge portion 15A, by considering the directions w1 and w2 in which the transport elements 21, 22 move.

The control unit 30 is configured to control the electrically magnetizable elements 11 of the conveying surface 10, so as to uncouple the first and second transport element 21, 22 at the discharge portion 15A of the opening 15.

In other words, the control unit 30 is configured to control the electrically magnetizable elements 11 in the discharge area 17 of articles A of the conveying surface 10, so as to uncouple the first and second transport element 21, 22 at the discharge portion 15A of the opening 15.

The conveying unit 20 is also provided with an integrated weighing system which allows to evaluate if the quantity of articles A positioned in the seat 23 is correct.

Starting from the applied power of each unit 20 the consumption due to the movement of the unit 20 itself is related to the mass transported and consequently the weight of the transported articles A is obtained.

In case in the seat 23 a not complying quantity of articles A is provided, the two transport elements 21, 22 are separated, discarding the articles A.

It is to be observed that the control unit is so configured to infer, starting from a supplying power of such units 20 (by means of an electrical parameters measure, for example current/voltage), a measure of the weight of the transported articles A. This determines an automatic and integrated weighing system. In fact, by means of the measure of an electrical parameter, it is possible to infer a measure of the weight of the transported articles A: a greater weight of articles A requires in fact greater power, to be transported.

Advantageously, the uncoupling of the elements 21, 22 allows defective or lacking articles A contained in the seats 23 of said conveying units 20 to be discharged.

In other words, in case the articles A contained in the seat 23 of the conveying unit 20 are damaged or in a not correct quantity, the uncoupling of the transport elements 21, 22 occurs at the opening 15 of the surface 10.

The two transport elements 21, 22 are separated and the damaged articles fall at the portion 15A of the opening 15 and are consequently discarded.

If the articles A contained in the seat 23 of the conveying unit 20 are intact and complying to packaging, the transport elements 21, 22 remain coupled until they reach the area 18 for releasing the conveyed articles A.

When the unit 20 arrives at the portion 15B of the opening 15 of the surface 10 (i.e. in the release area 18) the transport elements 21, 22 are separated thus releasing the intact conveyed articles A.

According to another aspect, the description relates to a packaging plant 100.

The packaging plant 100 comprises the apparatus 1 for conveying articles A according to what just described (and object of the appended claims).

The packaging plant 100 comprises a packaging line 110 to allow the packaging of the articles A conveyed by the conveying units 20.

At least a portion 110A of the packaging line 110 passes through a transfer portion 15B of articles A of the opening 15 of the conveying surface 10.

Preferably, as it is shown in FIG. 3, the packaging line 110 is developed in a position below the conveying surface 10 to pass then through the opening 15.

The control unit 30 is configured to control the electrically magnetizable elements 11 of the conveying surface 10, so as to uncouple the first and second transport elements 11 at the transfer portion 15B of articles A of the opening 15 of the conveying surface 10, to give the packaging line 110 the articles A contained in the seats 23 of said conveying units 20.

The control unit 30 is so configured to control the electrically magnetizable elements 11 in the area 18 for releasing articles A of the conveying surface 10, so as to uncouple the first and second transport element 21, 22 along the portions 12C and 13C of the first closed first and second closed path 12, 13 at the transfer portion 15B of the opening 15.

In other words, the articles A, at the conveying area 18 of the surface 10, are given the packaging line 110 leaving the conveying surface 10 and going forward towards the packaging.

Advantageously, the articles A are conveyed up to the packaging line 110 without that slipping and/or rolling can damage them.

Furthermore, the articles A arriving to the packaging line 110 have been controlled yet, for example thanks to the weighing system or by means of cameras, so to ensure that only the intact articles are packaged.

According to an aspect of the description, the description relates to a method for conveying articles A, in particular foodstuffs.

The method comprises a step of providing a conveying surface 10 comprising a plurality of electrically magnetizable elements 11.

The electrically magnetizable elements 11 are for example electrical coils.

The method comprises a step of providing a plurality of units 20 for conveying articles A, movable on said conveying surface 10, wherein each conveying unit 20 is defined by a first transport element 21 and a second transport element 22.

Each first and second transport element 21, 22 comprises at least a magnetic element 24.

The method comprises a step of coupling the first and second transport element 21, 22 with each other so as to define a seat 23 for housing articles of a conveying unit 20.

The method comprises a step of releasing articles A inside the seat 23 for housing the conveying unit 20.

In a preferred embodiment, the step of releasing articles A inside the seat 23 for housing conveying units 20 comprises a step of releasing articles A at the top inside the housing seat 23.

In particular, the articles A are released through an upper opening 25 of the conveying unit 20.

The method comprises a step of generating a predetermined variable magnetic field on the conveying surface 10 by activating and deactivating the electrically magnetizable elements 11, to allow consequently the first transport element 21 and the second transport element 22 to be moved on the conveying surface 10.

In other words, by magnetizing (according to different amplitudes and/or polarities) different areas of the surface 10 over time the first and second transport elements 21, 22 are moved on the conveying surface 10.

In an embodiment, the step of generating a predetermined variable magnetic field on the conveying surface 10 comprises a step of moving the first transport element 21 and the second transport element 22 along a direction x and/o a direction y (orthogonal to the direction x) of the conveying surface 10.

In an embodiment, the step of generating a predetermined variable magnetic field on the conveying surface 10 to allow the first transport element 21 and the second transport element 22 to move on said conveying surface 10 comprises a step of moving the first transport element 21 along a first closed path 12 lying on the conveying surface 10 and of moving the second transport element 22 along a second closed path 13 lying on the conveying surface 10.

The first and second closed path 12, 13 do not coincide.

The method comprises a step of uncoupling the first and second transport element 21, 22 at an opening 15 of the conveying surface 10.

In a preferred embodiment, the method comprises a step of uncoupling the first and second transport element 21, 22 at a discharge portion 15A of an opening 15 of the conveying surface 10, so as to discard defective articles A contained in the seat 23 for housing the conveying unit 20.

Advantageously, uncoupling the first and second transport element 21, 22 to discard defective articles A avoids that damaged articles are packaged.

It is an object of the description a packaging method comprising all the above described steps of the conveying method.

The packaging method comprises a packaging step of the articles A by means of a packaging line 110 to allow not discarded articles A to be packaged.

In more detail, at least a portion of the packaging line 110 passes through a transfer portion 15B of articles A of the opening 15 of the conveying surface 10.

Preferably, the packaging method comprises a step of uncoupling the first and second transport element 21, 22 of a conveying unit 20 at the transfer portion 15B of articles of the opening 15 of the conveying surface 10, to give the packaging line 110 the articles A contained in the seat 23 of the respective conveying unit 20.

The invention claimed is:

1. An apparatus for conveying articles comprising:
a planar conveying surface comprising a plurality of electrically magnetizable elements;
a plurality of conveying units for conveying articles, movable on said conveying surface, each of the conveying units being defined by a first transport element and by a second transport element configured for coupling with each other and defining, together, a seat for housing articles, the first and the second transport elements each comprising at least one magnetic element;
a control unit, connected to said electrically magnetizable elements of the conveying surface to activate and deactivate said electrically magnetizable elements, to generate a predetermined variable magnetic field on the conveying surface and thus allow the movement of said first transport element and second transport element above said conveying surface;
wherein the conveying surface further comprises a first portion and a second portion, the first portion not coinciding with the second portion, the control unit being configured to control the electrically magnetizable elements of the conveying surface to move the first transport elements in the first portion of the conveying surface along a first closed path and the second transport elements in the second portion of the conveying surface along a second closed path;
wherein the first transport elements move along the first closed path in a clockwise direction and the second transport elements move along the second closed path in a counterclockwise direction;
wherein the electrically magnetizable elements are configured to allow the generation of the predetermined variable magnetic field for moving the first and second transport elements of the conveying units in at least a first direction and a second direction orthogonal to the first direction on the conveying surface.

2. The apparatus according to claim 1, wherein said seat has an upper opening, to allow an insertion of the articles inside the seat.

3. The apparatus according to claim 1, wherein the first and second transport elements respectively comprise a first portion for housing the articles, defining a part of said seat, and a second portion housing said at least one magnetic element.

4. The apparatus according to claim 1, wherein the first and the second transport elements have an equal shape.

5. The apparatus according to claim 1, wherein the electrically magnetizable elements are configured to generate the predetermined variable magnetic field and rotate the first and second transport elements of the conveying units about an axis of rotation on the conveying surface.

6. The apparatus according to claim 1, wherein the conveying surface includes an opening therein and the control unit is configured to control the electrically magnetizable elements of the conveying surface, to uncouple, at an unloading portion of said opening, the first and second transport elements and allow defective articles contained in the seats of said conveying units to be discharged.

7. A packaging plant comprising:
the apparatus according to claim 1, wherein the conveying surface includes an opening therein,
a packaging line to allow a packaging of the articles conveyed by the conveying units, at least a portion of the packaging line passing through an article transfer portion of the opening of the conveying surface.

8. The packaging plant according to claim 7, wherein the control unit is configured to control the electrically magnetizable elements of the conveying surface, so as to uncouple, at the article transfer portion of the opening of the conveying surface, the first and second transport elements for transferring the articles contained in the seats of said conveying units to the packaging line.

9. A method for conveying articles comprising the following steps:
providing a planar conveying surface, comprising a plurality of electrically magnetizable elements;
providing a plurality of conveying units for conveying articles, movable on said conveying surface, each of the conveying units being defined by a first transport element and by a second transport element each comprising at least one magnetic element;
coupling respective ones of the first and second transport elements to each other to define a seat for housing articles of each of the conveying units;
releasing articles inside the seat;
generating a predetermined variable magnetic field on the conveying surface, activating and deactivating said electrically magnetizable elements to allow movement of the respective ones of the first and second transport elements above said conveying surface;
providing that the conveying surface further comprises a first portion and a second portion, the first portion not coinciding with the second portion,
controlling the electrically magnetizable elements of the conveying surface to move the first transport elements in the first portion of the conveying surface along a first closed path and the second transport elements in the second portion of the conveying surface along a second closed path;
moving the first transport elements along the first closed path in a clockwise direction and the second transport elements along the second closed path in a counterclockwise direction;
providing that the electrically magnetizable elements are configured to allow the generation of the predetermined variable magnetic field for moving the first and second transport elements of the conveying units in at least a first direction and a second direction orthogonal to the first direction on the conveying surface.

10. The method according to claim 9, and further comprising a step of uncoupling respective ones of the first and second transport elements, at an unloading portion of an opening of the conveying surface, to reject defective articles contained in the seat of a respective one of the conveying units.

11. The method according to claim 9, wherein the step of releasing articles inside the seat comprises a step of releasing the articles at a top inside of the seat.

12. A packaging method comprising all the steps of the conveying method of claim 9, the packaging method further comprising a step of packaging the articles with a packaging line.

13. The packaging method according to claim 12, and further comprising a step of uncoupling, at an article transfer portion of articles of an opening of the conveying surface, the respective ones of the first and second transport elements to transfer the articles contained in the seat to the packaging line, wherein at least one portion of the packaging line passes through the article transfer portion of the opening of the conveying surface.

14. An apparatus for conveying articles comprising:
a conveying surface comprising a plurality of electrically magnetizable elements;
a plurality of conveying units for conveying articles, movable on said conveying surface, each of the conveying units being defined by a first transport element and by a second transport element configured for coupling with each other and defining, together, a seat for housing articles, the first and the second transport elements each comprising at least one magnetic element;
a control unit, connected to said electrically magnetizable elements of the conveying surface to activate and deactivate said electrically magnetizable elements, to generate a predetermined variable magnetic field on the conveying surface and thus allow the movement of said first transport element and second transport element above said conveying surface;
wherein the conveying surface includes an opening therein and the control unit is configured to control the electrically magnetizable elements of the conveying surface, to uncouple, at an unloading portion of said opening, the first and second transport elements and allow defective articles contained in the seats of said conveying units to be discharged.

15. A packaging plant comprising:
an apparatus for conveying articles comprising:
a conveying surface comprising a plurality of electrically magnetizable elements;
a plurality of conveying units for conveying articles, movable on said conveying surface, each of the conveying units being defined by a first transport element and by a second transport element configured for coupling with each other and defining, together, a seat for housing articles, the first and the second transport elements each comprising at least one magnetic element;
a control unit, connected to said electrically magnetizable elements of the conveying surface to activate and deactivate said electrically magnetizable elements, to generate a predetermined variable magnetic field on the conveying surface and thus allow the movement of said first transport element and second transport element above said conveying surface;
wherein the conveying surface includes an opening therein,
a packaging line to allow a packaging of the articles conveyed by the conveying units, at least a portion of the packaging line passing through an article transfer portion of the opening of the conveying surface.

16. The packaging plant according to claim 15, wherein the control unit is configured to control the electrically magnetizable elements of the conveying surface, so as to uncouple, at the article transfer portion of the opening of the conveying surface, the first and second transport elements for transferring the articles contained in the seats of said conveying units to the packaging line.

17. A packaging method, comprising:
providing a conveying surface, comprising a plurality of electrically magnetizable elements;
providing a plurality of conveying units for conveying articles, movable on said conveying surface, each of the conveying units being defined by a first transport element and by a second transport element each comprising at least one magnetic element;
coupling respective ones of the first and second transport elements to each other to define a seat for housing articles of each of the conveying units;
releasing articles inside the seat;
generating a predetermined variable magnetic field on the conveying surface, activating and deactivating said electrically magnetizable elements to allow movement of the respective ones of the first and second transport elements above said conveying surface;
packaging the articles with a packaging line;
uncoupling, at an article transfer portion of articles of an opening of the conveying surface, the respective ones of the first and second transport elements to transfer the articles contained in the seat to the packaging line, wherein at least one portion of the packaging line passes through the article transfer portion of the opening of the conveying surface.

* * * * *